Figure 1:
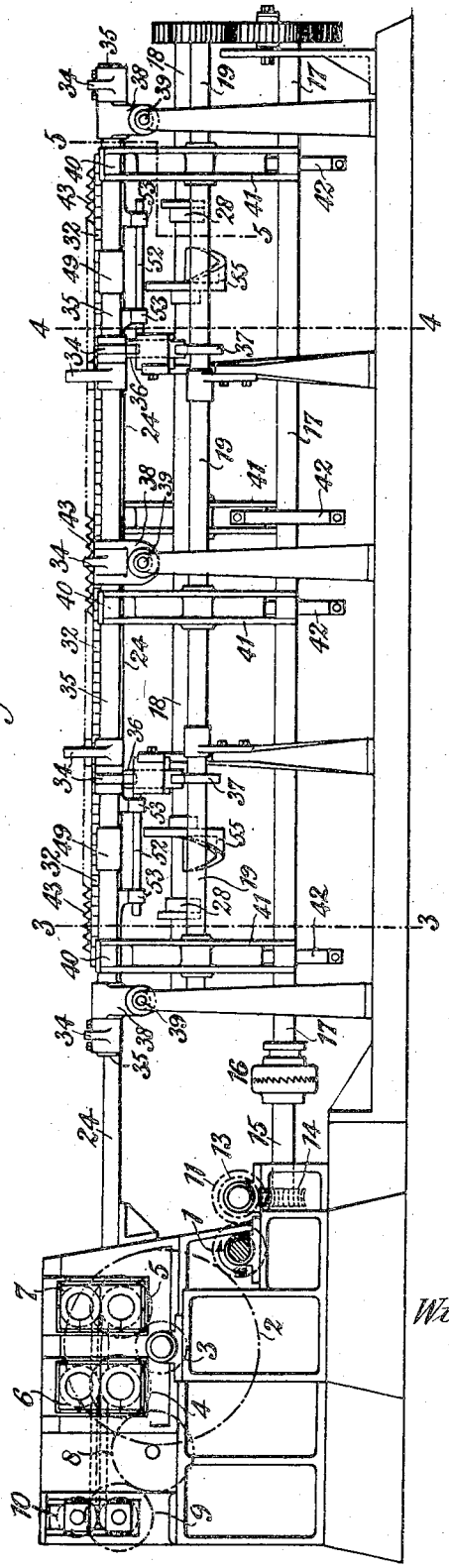

No. 890,127. PATENTED JUNE 9, 1908.
F. H. CRITTALL.
MACHINE FOR MANUFACTURING EXPANDED METAL.
APPLICATION FILED FEB. 17, 1908.

6 SHEETS—SHEET 1.

Witnesses
M. Lilian Adams.
E. B. Franzoni.

Inventor
F. H. Crittall,
By his Attorneys,
Baldwin Wight.

No. 890,127. PATENTED JUNE 9, 1908.
F. H. CRITTALL.
MACHINE FOR MANUFACTURING EXPANDED METAL.
APPLICATION FILED FEB. 17, 1908.
6 SHEETS—SHEET 2.

Witnesses
M. Lilian Adams.
L. B. Franzori.

Inventor
F. H. Crittall,
By his Attorneys,
Baldwin Wight.

No. 890,127. PATENTED JUNE 9, 1908.
F. H. CRITTALL.
MACHINE FOR MANUFACTURING EXPANDED METAL.
APPLICATION FILED FEB. 17, 1908.

6 SHEETS—SHEET 3.

Witnesses.
M. Lilian Adams.
E. E. Evanzoni.

Inventor.
F. H. Crittall,
By his Attorneys,
Baldwin Wight

No. 890,127.  PATENTED JUNE 9, 1908.
F. H. CRITTALL.
MACHINE FOR MANUFACTURING EXPANDED METAL.
APPLICATION FILED FEB. 17, 1908.
6 SHEETS—SHEET 4.
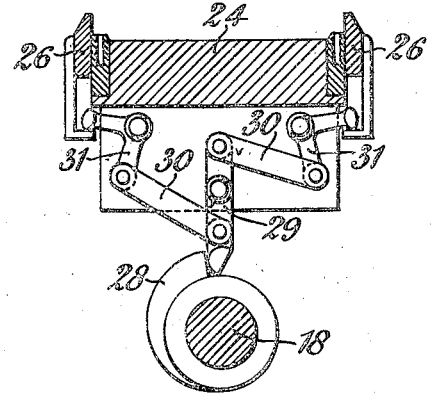
Fig. 7.
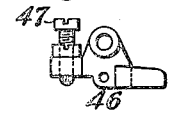
Fig. 8.ˣ
Fig. 9.ˣ
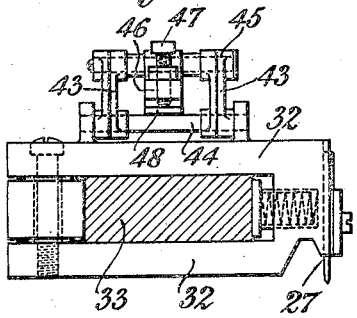
Fig. 8.
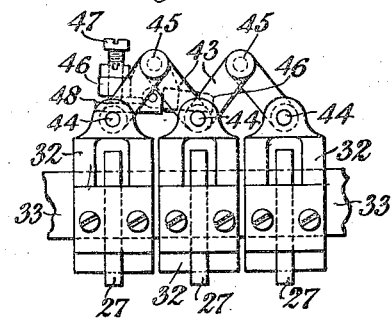
Fig. 9.
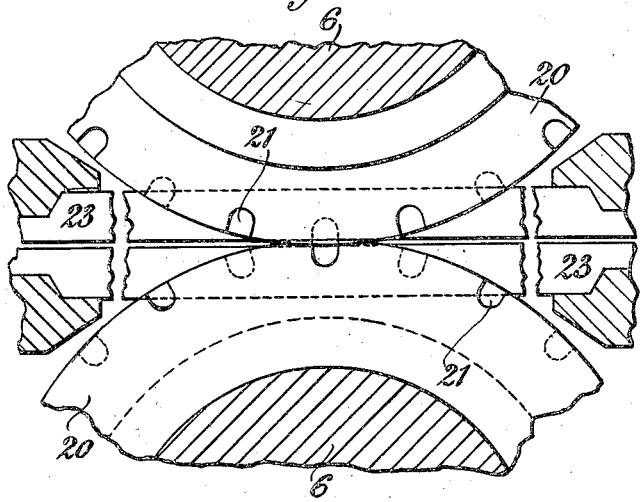
Fig. 10.
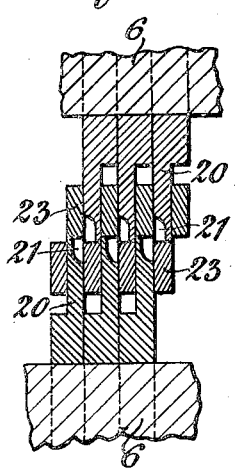
Fig. 11.
Witnesses
M. Lilian Adams
E. B. Franzini
Inventor
F. H. Crittall,
by his Attorneys,
Baldwin Wight No. 890,127. PATENTED JUNE 9, 1908.
F. H. CRITTALL.
MACHINE FOR MANUFACTURING EXPANDED METAL.
APPLICATION FILED FEB. 17, 1908.
6 SHEETS—SHEET 5.
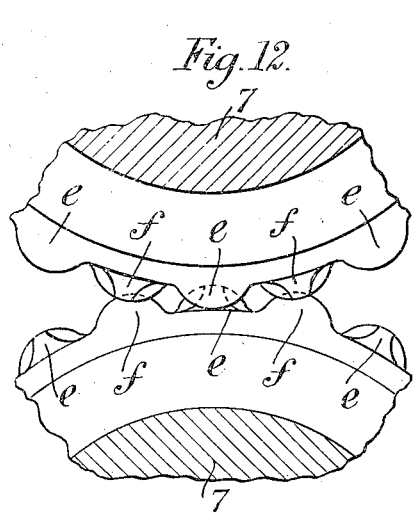
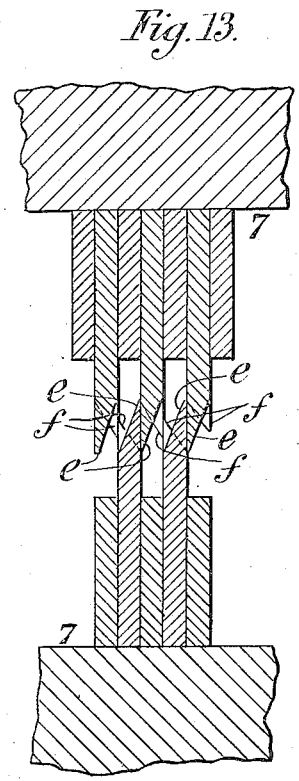
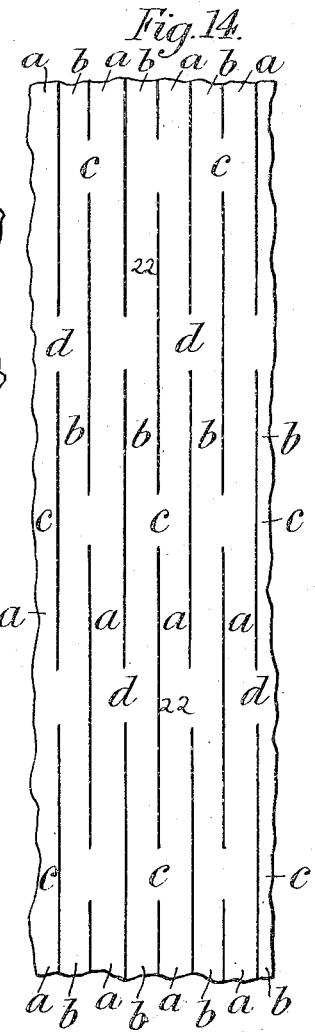
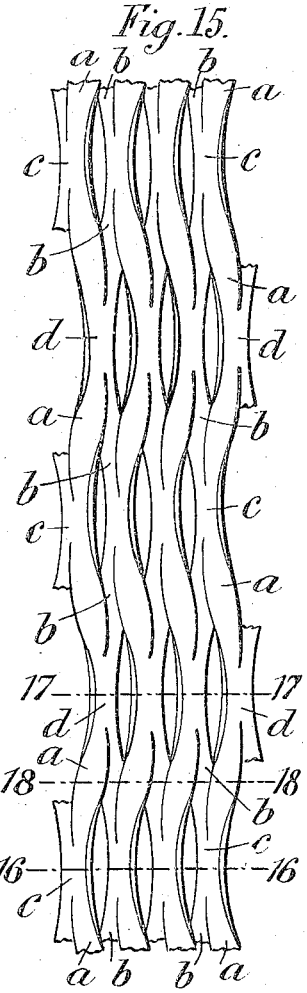
Witnesses
M. Lilian Adams.
E. R. Granzoni
Inventor
F. H. Crittall,
By his Attorneys,
Baldwin & Wight.

No. 890,127. PATENTED JUNE 9, 1908.
F. H. CRITTALL.
MACHINE FOR MANUFACTURING EXPANDED METAL.
APPLICATION FILED FEB. 17, 1908.
6 SHEETS—SHEET 6.

Witnesses.
M. Lilian Adams.
E. B. Franjou.

Inventor.
F. H. Crittall,
By his Attorneys,
Baldwin & Wight

UNITED STATES PATENT OFFICE.

FRANCIS HENRY CRITTALL, OF BRAINTREE, ENGLAND.

MACHINE FOR MANUFACTURING EXPANDED METAL.

No. 890,127.   Specification of Letters Patent.   Patented June 9, 1908.

Application filed February 17, 1908. Serial No. 416,234.

*To all whom it may concern:*

Be it known that I, FRANCIS HENRY CRITTALL, engineer, a subject of the King of Great Britain, residing at Manor Works, Braintree, in the county of Essex, England, have invented new and useful Improvements in Machines for Manufacturing Expanded Metal, of which the following is a specification.

In my British Patent No. 21,083, of Oct. 17, 1905, I have shown mechanism whereby expanded metal is made by forming in a sheet parallel longitudinal rows of short slits and then pulling the sides of the sheet apart thus opening the slits into diamond shaped holes. The process described in said patent puts a considerable strain on the uncut portions of metal between the ends of the slits of each row such portions forming the junctions at the corners of the meshes of the resulting network. This fact limits the lateral extension of the sheet. According to my present invention these uncut portions of metal are more or less relieved from strain by arranging them at an angle to project from opposite sides of the plane of the expanded sheet and causing the strips forming the sides of the meshes to twist helically. This result can be produced in the following manner:—The sheet of metal is slit in rows as usual the rectangular junctions of uncut metal between the ends of the slits of each row being midway along the slits of the adjacent rows. The sheet is thus divided into narrow longitudinal strips connected by these rectangular junctions which lie in transverse rows about half the length of a slit apart. The junctions are then turned about longitudinal axes until they are approximately at right angles to the plane of the sheet, all the junctions of one transverse row being turned in the same direction, while all the junctions of the two adjacent transverse rows are turned in the opposite direction. The effect of this is to give a helical twist to the strips and when the sheet is expanded in the ordinary way they retain this twist and the junctions remain more or less at right angles to the plane of the sheet. In the finished article also the whole length of each strip is on one side of the plane of the sheet, adjacent strips being on opposite sides of this plane. The bending of the junctions may conveniently be performed by means of rolls having saw like teeth each beveled on one side.

The drawings show a machine suitable for carrying out the process. The mechanism shown is similar in many respects to that illustrated in my British patent above mentioned but in place of the corrugating rolls shown in that patent I have arranged improved rolls for turning the junctions of the slit sheet out of the plane of the sheet and for twisting the strands according to my improvements.

Figure 2:
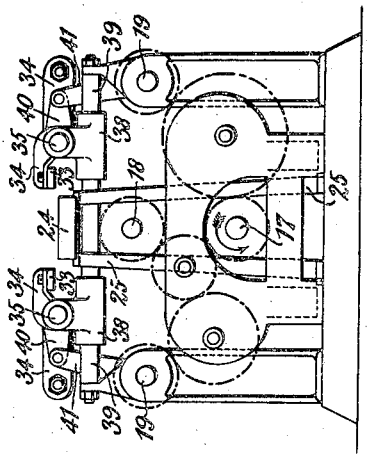
Figure 3:
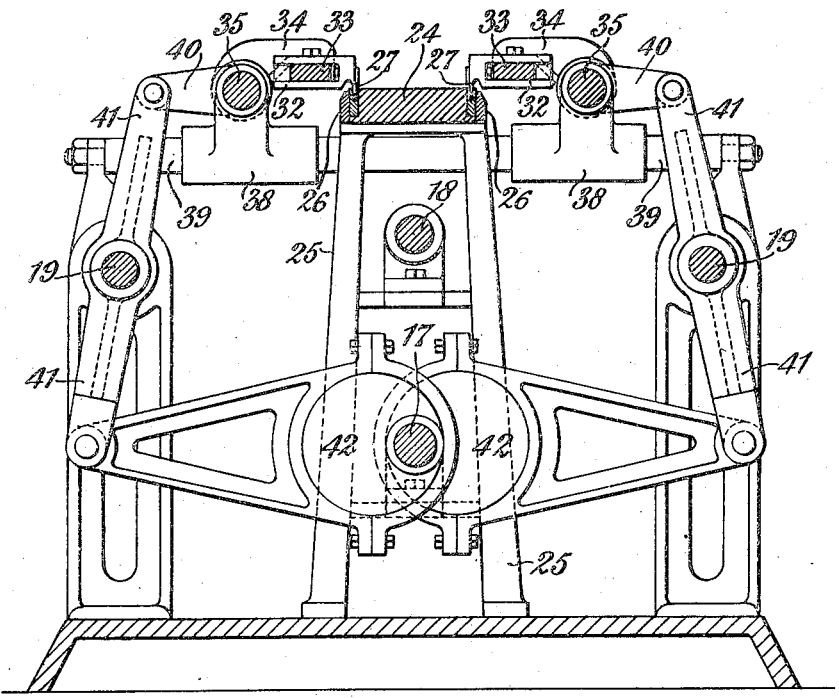
Figure 5:
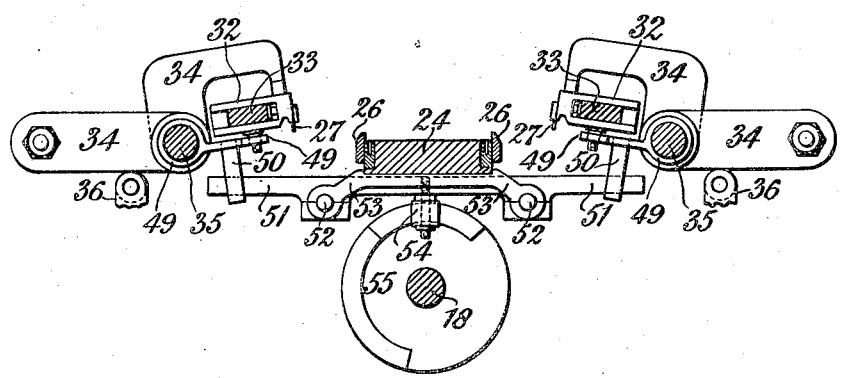
Figure 4:
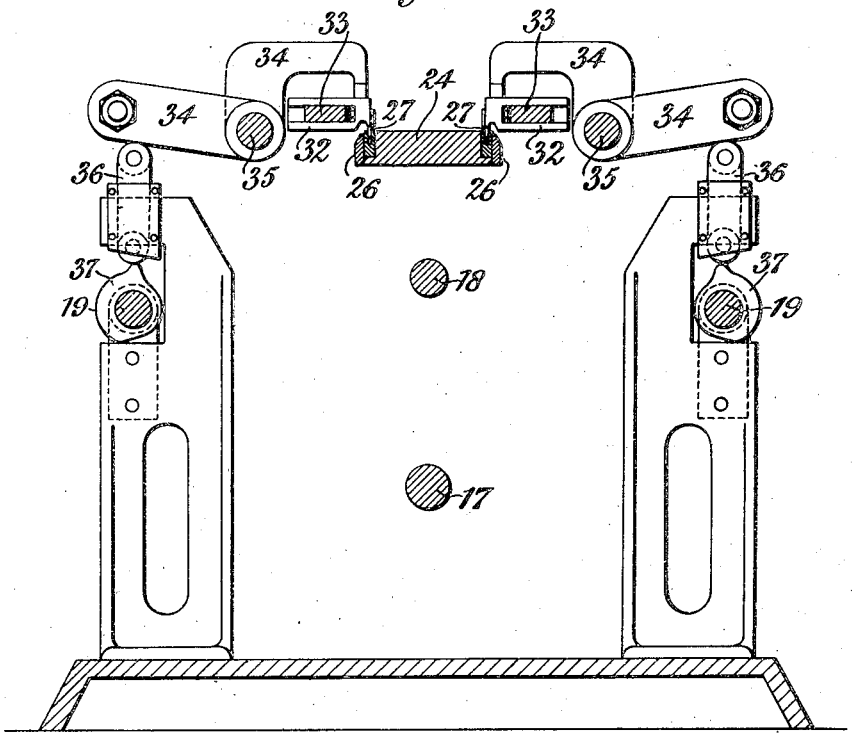
Figure 6:
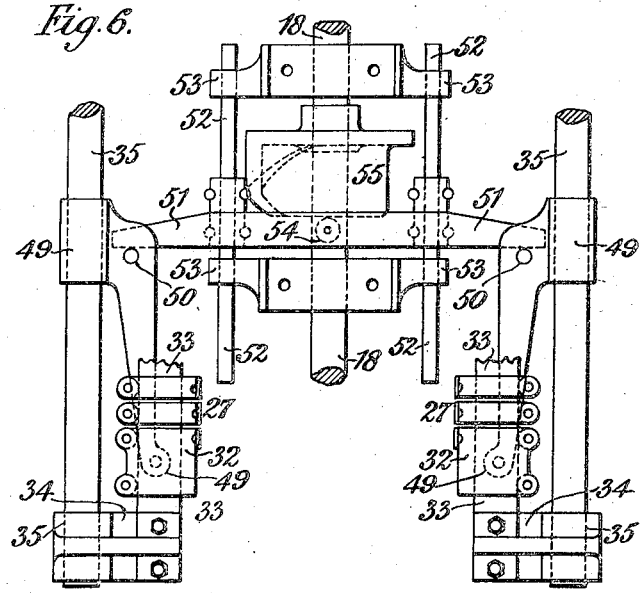
Figure 19:
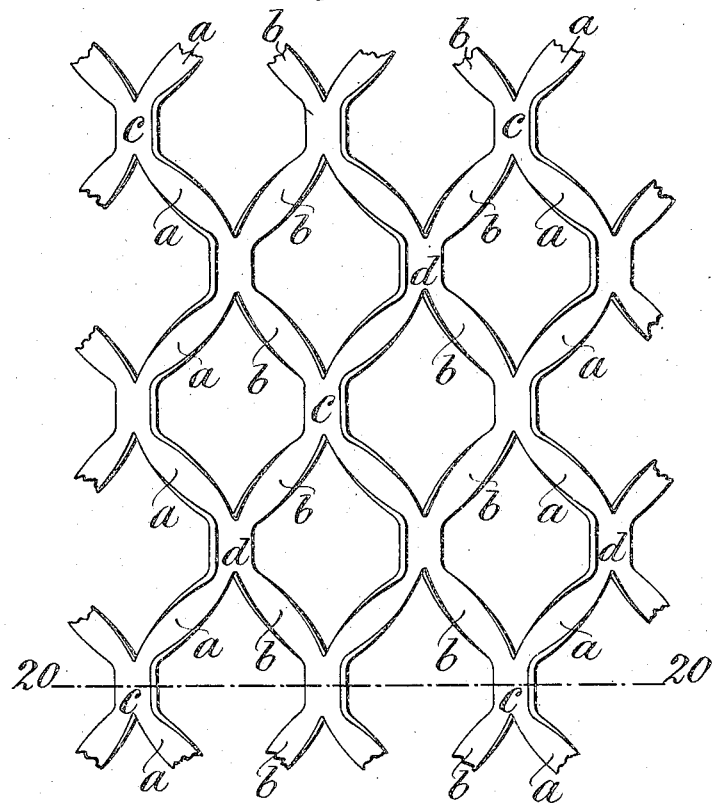
Figure 20:
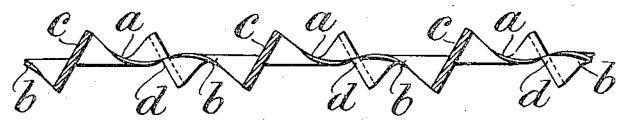

Figure 1 is a side elevation, and Fig. 2 is an end elevation of a machine embodying this invention. Figs. 3, 4 and 5 are transverse sections (to twice the scale of Figs. 1 and 2) on the lines 3—3, 4—4, and 5—5, Fig. 1. In these figures many parts are omitted for the sake of clearness. Fig. 6 is a local plan of Fig. 5. Figs. 7 and 8 are local transverse sections and Fig. 9 is a local side elevation showing details. Figs. 8* and 9* are detached views of some of the parts. Fig. 7 is four times and Figs. 8, 9, 8* and 9* are eight times the scale of Figs. 1 and 2. Figs. 10 and 11 are longitudinal and transverse sections of the slitting rolls 6, these figures are sixteen times the scale of Figs. 1 and 2. Fig. 12 is a part side elevation and Fig. 13 a part radial section of the saw toothed rolls 7. Fig. 14 is a plan of the sheet after it has been slit and Fig. 15 is a plan of the same sheet after it has passed through the rolls 7. Figs. 16, 17 and 18 are local sections on the lines 16—16, 17—17 and 18—18 Fig. 15 the parts behind the planes of section being omitted. Fig. 19 is a plan of the finished sheet and Fig. 20 is a section on the line 20—20 Fig. 19. Fig. 12 is sixteen times and Figs. 13 to 20 are thirty two times the scale of Figs. 1 and 2.

As before stated, the mechanism shown is largely similar to that shown in my British patent before referred to but the mechanism is changed in the respect before mentioned and as thus changed the machine is well adapted for performing the various steps in the manufacture of the desired article.

1 (Fig. 1) is a toothed wheel fixed to the main shaft of the machine. 2 is a toothed wheel gearing with the wheel 1 and fixed to the same shaft as the wheel 3 which gears with wheels 4 and 5 fixed respectively to the shafts of one of the slitting rolls 6 and one of the saw toothed rolls 7. 8 is a wheel gearing with the wheel 4 and also with the wheel 9 fixed to the shaft of one of the feed rolls 10. The wheel 1 also gears with a wheel 11 on the spindle of a worm 13 gearing with a worm wheel 14 on the longitudinal shaft 15. This shaft transmits motion through a clutch 16 to another longitudinal shaft 17. The shaft 17 drives through trains of gearing (clearly shown at Fig. 2) three longitudinal shafts 18, 19, 19, the four shafts actuating the expanding mechanism as hereinafter described.

The slitting rolls 6 are geared together by wheels (not shown) in the ordinary manner and as is clearly shown at Figs. 10 and 11 each slitting roll consists of a number of disks 20 separated from each other by the thickness of a disk, and the disks of one roll just enter the spaces between the disks of the other roll, thus forming a series of shear blades. The edges of the disks have notches 21 in them equally spaced around their circumferences, and situated alternately on opposite faces of them, and at these points the disks do not cut the metal sheet. The notches of one series are midway between the notches of the other series, so that the metal sheet after passing through the rolls has in it a number of parallel lines of slits 22 (Fig. 14) the sheet being divided by the slits into narrow strips $a\ b\ a\ b$ &c. connected together by rectangular junctions $c\ d\ c\ d$ &c. of uncut metal.

In order to prevent the sheet of metal sticking in the rolls 6 two parallel grids 23 (Figs. 10 and 11) are provided, the bars of which lie between the disks of the two rolls. There is a space between these two grids sufficient to allow the sheet of metal to pass.

The saw toothed rolls 7 (Figs. 12 and 13) are like the rolls 6 built up of parallel disks. Each of these disks are provided with teeth $e\ f$. One side of each of these teeth is a plane radial surface while the other side is rounded and beveled so that the periphery of each tooth is a blunt edge. The teeth $e$ and $f$ are arranged alternately and face opposite ways as shown. The teeth $e$ act upon the junctions $c$ and turn them from right to left as shown at Fig. 16 while the teeth $f$ act on the junctions $d$ and turn them from left to right as shown at Fig. 17. In each case the junction is bent between the rounded faces of the upper and lower rolls. In the finished sheet, Figs. 19 and 20, the junctions $c$ and $d$ retain their more or less vertical position so that the strips $a$ are all on the top of the sheet and the strips $b$ at the bottom.

The sheet of metal after leaving the saw toothed rolls 7 is passed by hand to a guide trough and the clutch 16 is thrown in by a treadle thus starting the expanding mechanism. The guide trough is formed of a fixed table 24 supported by standards 25 and two movable sides 26 which are depressed out of the way when the jaws 27 descend to sieze the edges of the sheet as is clearly shown at Fig. 7 by a cam 28 which acts on a lever 29 connected by links 30 to bell crank levers 31 which operate them. The sides 26 are brought back by springs which are not shown.

As shown at Fig. 4 the cams 37 have three lifts. When the slide 36 is on the highest lift (as shown at Fig. 4) the points of the jaws 27 penetrate through the edge of the unexpanded sheet of metal into holes in the edge of the table 24 but as the cam 37 revolves the slide 36 almost immediately descends on to the middle lift and the points of the jaws 27 are raised out of the holes and they are then free to move laterally away from the table. At the end of the expanding process the slides 36 descend onto the lowest lift of the cams 37 raising the jaws 27 still higher so that the sides 26 of the table 24 can be raised without coming into contact with the underside of the expanded sheet of metal thus allowing an unexpanded sheet to be slid into position on the table 24 while the expanded sheet is being knocked off the jaws 27. The blocks 32 which carry the two series of jaws 27 (Figs. 8 and 9) for expanding the slit sheet are free to move on two parallel bars 33 carried by arms 34 fixed to two longitudinal rock shafts 35. The arms 34 are acted on by slides 36 and cams 37 (Fig. 4) which cause the bars 33 and jaws 27 to descend at the proper times, piercing through the edges of the sheet and entering slots in the edges of the table. The rock shafts 35 have fixed to them weighted arms (not shown) which tend to turn the shafts and keep the arms 34 in contact with the slides 36 and cause the jaws 27 to rise when they are free to do so. Immediately therefore the nose of the cam 37 has passed from beneath the slide 36 the jaws rise to the level of the top of the table and just clear of the slots in it, thus retaining their hold on the sheet. The bearings of the shafts 35 are carried by blocks 38 free to move on transverse guides 39 (Fig. 3) and the shafts 35 are connected by links 40 to levers 41 acted upon by eccentrics 42 fixed on the shaft 17 which at the proper times draw the two series of jaws 27 transversely outwards away from each other and so expand the slit sheet. The blocks 32 carrying the jaws of each series are connected to each other by links 43 acting somewhat like lazy tongs so that they are equidistant from each other when fully separated. The details of this arrangement are shown at Figs. 8, 9, 8* and 9*. The links 43 are in pairs their lower ends being pivoted to the blocks 32 by transverse pins 44 and their upper ends to transverse pins 45. Hung from the middle of the pins 45 are inverted T shaped stops 46 (Fig. 8*) one end of which is forked while the other end carries a set screw 47, the end of which bears on a tongue 48 (Fig. 9*) pivoted near the bottom of the middle of the stop 46. Only one of these stops is shown in Fig. 9 but it will be understood that one is hung from each pin 45. When the blocks 32 are separated to the full extent the forked end of each stop rests on one of the pins 44 and the end of its tongue 48 rests on the next pin 44 lying between the arms of the forked end of the adjacent stop. When in this position the stop supports the pin 45 and prevents its further descent and therefore the further separation of the blocks 32. By turning the screws 47 the maximum distance between the blocks 32 can be adjusted.

The block 32 carrying the center jaw 27 of each series is fixed to the bar 33, the other blocks moving on the bar and closing up towards the central jaw when the sheet is being expanded. After a sheet has been expanded the blocks are separated again in the following manner:—The blocks at each end of each series are fixed to slides 49 (Figs. 5 and 6) free to move along the shafts 35. These slides carry pins 50 which engage with a bar 51 carrying guide rods 52 which work in guides 53 fixed to the underside of the table 24. The bar 51 has on its underside a roller 54 which is acted on by a cam 55 fixed on the shaft 18. When the sheet has been expanded, the jaws 27 rise as shown at Fig. 5 above the level of the table and the sheet being no longer supported by the latter drops off the jaws or is readily knocked off by hand, and then the cams 55 come into operation and push the end blocks 32 longitudinally outwards away from the middle of the machine. The blocks then move transversely inwards, the jaws 27 descend and take hold of the edges of the next sheet, the blocks 32 move transversely outwards thus expanding the sheet, and at the same time the blocks move longitudinally inwards towards the middle of the machine and so on.

It will be observed that the blocks 32 are only controlled by the cams 55 when they are being separated and the jaws therefore are not engaging with the slit sheet of metal. When the latter is being expanded the blocks are entirely free and their inward movement is entirely governed by the pull of the slit sheet in expanding, no undue strain therefore is put on any part of the sheet. This arrangement also allows the same machine to be used without alteration for different qualities of metal.

It will be observed that the junctions of the strips are turned out of the plane of the sheet and the strips are twisted by a rolling operation immediately following the slitting operation and that after having passed through these operations the sheets are ready for the expanding mechanism to which they may be immediately conveyed. The expanding mechanism operates to expand all the meshes in a sheet simultaneously and not gradually or step by step as in some other processes. In this way the speed of production is largely increased and the treatment given to the metal before expanding is such that a maximum area of expanded metal may be obtained from a given amount of material as the meshes are practically square instead of elongated or diamond-shaped and this is done without undue strain or weakening of the junctions or any other parts of the fabric. In my application for patent No. 416,233, filed Feb. 17, 1908, I have claimed my improved process herein described and my improved article I have claimed in my application filed April 7, 1908, No. 425,717.

What I claim is:—

1. The combination of means for forming in a sheet of metal parallel, longitudinal rows of slits, means for turning the junctions between the ends of the slits of each row to cause them to project from opposite sides of the plane of the sheet and means for subsequently expanding the sheet.

2. The combination of means for forming in a sheet of metal parallel longitudinal rows of slits, means for turning the junctions between the ends of the slits of each row out of the plane of the sheet to cause each junction to project from opposite sides of the plane of the sheet, all the junctions in one transverse row being turned in the same direction while all the junctions of the two adjacent transverse rows are turned in the other direction, and means for expanding the sheet.

3. The combination of means for forming in a sheet of metal parallel longitudinal rows of slits, a pair of rolls with over-lapping saw like teeth adapted to engage with the edges of the junctions between the ends of the slits of each row, and means for expanding the sheet.

4. The combination of means for forming in a sheet of metal parallel longitudinal rows of slits, a pair of rolls with saw like teeth mounted and adapted to engage with the edges of the junctions between the ends of the slits of each row to turn said junctions in opposite directions out of the plane of the sheet, alternate teeth engaging respectively with the right and left hand edges of the junctions, and means for expanding the sheet.

5. The combination of means for forming in a sheet of metal parallel longitudinal rows of slits, a pair of rolls with saw like teeth adapted to engage with the edges of the junctions between the ends of the slits of each row, each tooth having on one side a plane radial surface while the other side is rounded and beveled, and means for expanding the sheet.

6. The combination of means for forming in a sheet of metal parallel longitudinal rows of slits, a pair of rolls with saw like teeth adapted to engage with the edges of the junctions between the ends of the slits of each row, alternate teeth engaging respectively with the right and left hand edges of the junctions, each tooth having on one side a plane radial surface while the other side is rounded and beveled, and means for expanding the sheet.

7. The combination of means for forming in a sheet of metal parallel longitudinal rows of slits, means for turning the junctions between the ends of the slits of each row out of the plane of the sheet to cause each junction to project from opposite sides of the plane of the sheet, and means for seizing the two edges of the sheet and pulling them apart.

8. The combination of means for forming in a sheet of metal parallel longitudinal rows of slits, means for turning the junctions between the ends of the slits of each row out of the plane of the sheet, all the junctions in one transverse row being turned in the same direction while all the junctions of the two adjacent transverse rows are turned in the other direction simultaneously twisting the strips between the junctions, and means for seizing the two edges of the sheet and pulling them apart.

9. The combination of means for forming in a sheet of metal parallel longitudinal rows of slits, a pair of rolls with saw like teeth adapted to engage with the edges of the junctions between the ends of the slits of each row to turn said junctions out of the plane of the sheet and to twist the strips between the junctions, and means for seizing the two edges of the sheet and pulling them apart.

10. The combination of means for forming in a sheet of metal parallel longitudinal rows of slits, a pair of rolls with saw like teeth adapted to engage with the edges of the junctions between the ends of the slits of each row, alternate teeth engaging respectively with the right and left hand edges of the junctions, and means for seizing the two edges of the sheet and pulling them apart.

11. The combination of means for forming in a sheet of metal parallel longitudinal rows of slits, a pair of rolls with saw like teeth adapted to engage with the edges of the junctions between the ends of the slits of each row, each tooth having on one side a plane radial surface while the other side is rounded and beveled, and means for seizing the two edges of the sheet and pulling them apart.

12. The combination of means for forming in a sheet of metal parallel longitudinal rows of slits, a pair of rolls with saw like teeth adapted to engage with the edges of the junctions between the ends of the slits of each row, alternate teeth engaging respectively with the right and left hand edges of the junctions, each tooth having on one side a plane radial surface while the other side is rounded and beveled, and means for seizing the two edges of the sheet and pulling them apart.

FRANCIS HENRY CRITTALL.

Witnesses:
H. D. JAMESON,
F. L. RAND.